United States Patent [19]

Calkins

[11] Patent Number: 5,016,115
[45] Date of Patent: May 14, 1991

[54] POINT TO MULTI POINT FAX TRANSMISSION METHOD AND SYSTEM

[75] Inventor: Jeffrey E. Calkins, Tulsa, Okla.

[73] Assignee: United Video, Inc., Tulsa, Okla.

[21] Appl. No.: 405,333

[22] Filed: Sep. 11, 1989

[51] Int. Cl.$^5$ .............................................. H04N 1/32
[52] U.S. Cl. .................................... 358/442; 358/402; 358/469; 379/100
[58] Field of Search ............... 358/402, 434, 438, 469, 358/409, 407, 442; 455/75, 344; 379/100

[56] References Cited

U.S. PATENT DOCUMENTS

| | | | |
|---|---|---|---|
| 4,251,836 | 2/1981 | Moreau | 358/409 |
| 4,384,307 | 5/1983 | Kuzmik et al. | 358/442 |
| 4,837,812 | 6/1989 | Takahashi et al. | 358/434 |
| 4,847,694 | 7/1989 | Nishihara | 358/434 |
| 4,922,546 | 5/1990 | Takahashi et al. | 358/434 |

*Primary Examiner*—Edward L. Coles, Sr.
*Attorney, Agent, or Firm*—Head & Johnson

[57] ABSTRACT

A method of simultaneously transmitting information to a plurality of standard facsimile (fax) receivers in which each receiver may have timing and response characteristics which vary from other receivers, including the steps of transmitting by a selective carrier path a unitary signal from a unitary transmitter location to a plurality of fax receivers time-spaced ring signals, the number of ring signals being at least equal to the number of ring signals to which each of the receivers is responsive, delaying further transmission a preselected length of time during which the individual receivers generate standard calls, station identification and other signals which are irrelevant to the transmitter, transmitting predetermined command signals which are simultaneously received by the facsimile receivers as required to place all receivers in condition to receive a fax message, delaying further transmission at a preselected length of time during which the individual receivers generate standard confirmation to receive signals which are also irrelevant to the transmitter, transmitting a fax message simultaneously to the plurality of receivers and transmitting an end of procedure message simultaneously to the plurality of receivers. In an alternate embodiment, the fax receivers may include addressable codes so that information may be simultaneously transmitted only to those fax receivers which are addressed.

3 Claims, 5 Drawing Sheets

POINT TO MULTI POINT FAX TRANSMISSION METHOD AND SYSTEM

SUMMARY OF THE INVENTION

The present disclosure is to a method and a system which enables a plurality of diversely spaced facsimile (fax) machines to simultaneously receive in real time a facsimile document transmitted from a single point. The method and system uses a oneway transmission path, such as a one-way satellite, FM radio, microwave or cable television network to simultaneously deliver a transmitted signal to such plurality of fax machines.

In the practice of the concept of this disclosure, each location can use existing standard G3 fax machines to transmit and receive documents by utilizing the standard telephone company network. By the present disclosure, however, a document can be transmitted to multiple fax receivers from a remote location. In order for the individual fax machines to be responsive to the method and system of this disclosure and to receive simultaneously with the other multiple receivers a fax transmission, each such receiving machine is provided with a synchronizer which consists of a solid-state circuit having an input for connection to a demodulator and for connection to a standard telephone transmission line and an output connected to the standard fax receiver.

The one-way transmission path works with a CCITT G3 standard fax machine functioning as a document source (although a computer can also function as a document source in the same way that a computer can presently be used as a document source to an individual fax receiver.) and any number of CCITT G3 standard fax machines in conjunction with synchronizers serving as receivers. The G3 rule standards dictate that two normal conversing fax machines exchange information with positive acknowledgement. In the presently disclosed one-way broadcast transmission path, the transmitting device lacks the return carrier path, and, therefore, does not receive positive acknowledgement signals. The transmission path operates by transmitting information to a plurality of fax machines and waits a preselected time for the positive acknowledgement signals which are not received. If the transmission path is of telephone quality or better and barring technical malfunction, the receiving fax machines communicate simultaneously with the transmitter. The transmitting fax machine transmits a message and assumes that a positive response is returned.

Standard existing fax machines have diverse capabilities. Normally, information is communicated between two fax machines before a picture message is transmitted. The transmission scheme of this disclosure works by choosing the least common denominator capabilities of all the fax machines on the network and transmits in accordance with such capabilities. Variances from one fax machine to another fax machine typically relate to such factors as transmission speed, size of page, resolution, etc. The diversity of existing fax machines creates a timing problem which is solved by the method and system of this disclosure. Different models of existing fax machines answer the phone on different ring counts and respond differently according to their capabilities. Because of the different idiosyncrasies of existing fax machines, the multiple fax machines require synchronization so they will all be in a position to receive a fax image simultaneously. For this purpose, a passive device or synchronizer is receptive to synchronization signals from the transmitter prior to the transmission of a document. Each fax machine in this method is unable to distinguish between such passive device and the telephone company central office. Putting it another way, the fax machine is unable to differentiate between connection to the telephone system or the synchronizer box supplied in the system of this disclosure. The synchronizer box initiates a "receive only" fax message by providing a ring to the fax machine. Such ring is time delayed and sychronized with the fax machine to initiate the conversation, so that all fax receivers are in condition to receive a document simultaneously.

Transmission is accomplished by the transmitting facility without receiving responses to the preliminary instructional messages sent by the transmitter since the system does not include a path for transmission of information from any of the multiple fax receivers back to the transmitting station.

The synchronizer box used in the system of this disclosure is individually addressable and performs synchronization by a delay, and otherwise functions as a pseudo telephone company. The synchronization box permits the use of normally transmitted and received fax documents over a standard telephone company line if desired.

In the present system, the user of the fax network is able to use a normal fax machine as a document source to transmit a document to the transmitting station. The document to be transmitted is archived, and, subsequently, is simultaneously transmitted to a plurality of fax receivers.

The present disclosure provides a method for simultaneously transmitting information to a plurality of fax receivers in which each receiver includes a fax machine which has timing and response characteristics which may vary from the fax machines at other receivers. The method includes transmitting by way of a selective carrier, such as microwave transmission, radio transmission, satellite transmission, or cable system transmission, a unitary signal from a unitary transmitter to a plurality of fax receivers connected to receive the carrier. The step of transmitting includes providing time-spaced ring signals, the number of ring signals being at least equal to the number of ring signals to which the fax machine of each fax receiver is responsive. "Ring signals" means a signal replicating that used by the standard telephone format to activate a nascent fax machine.

The next step in the method is to delay further transmission a preselected length of time during which the individual fax machines typically generate standard call information identification, and other signals which are typically fed back to the sending fax machine, but which in the method of this disclosure are ignored since the system does not require nor anticipate the use of any carrier for conveying messages from the plurality of individual receivers back to the transmitter.

The next step is that of transmission of predetermined command signals which are simultaneously received by each of the individual fax receivers as required to place all such receivers in condition to receive a fax message. Further action of the transmitter is delayed for a preselected length of time during which the fax machines at each of the individual fax receivers typically generate standard confirmation to receive signals. Again, these confirmation to receive signals are irrelevant to the method of this disclosure, since as previously indicated the method does not require nor anticipate the use of a carrier system of conveying messages from the plurality of facsimile receivers back to the transmitter.

After such delay, the fax message or image is simultaneously conveyed by the carrier system on a real time basis to each of the individual fax receivers. After the message or image is completed, the transmitter transmits an end of procedure message which is simultaneously received by each of the plurality of receivers.

In addition to the employment of circuitry for accomplishing the transmission from a standard facsimile machine or computer document source to a carrier, the only physical equipment required in the employment of the method and system of this disclosure is to provide at each of the receiving stations for use with a standard fax machine a synchronizer which monitors the transmission from the master fax transmitter and adapts the timing sequences to match the individual fax machines to thereby place all the fax receivers in condition to receive the subsequently transmitted message.

A better understanding of the invention will be had by reference to the following description and claims, taken in conjunction with the attached drawings.

DESCRIPTION OF THE PREFERRED EMBODIMENT

Figure 1:
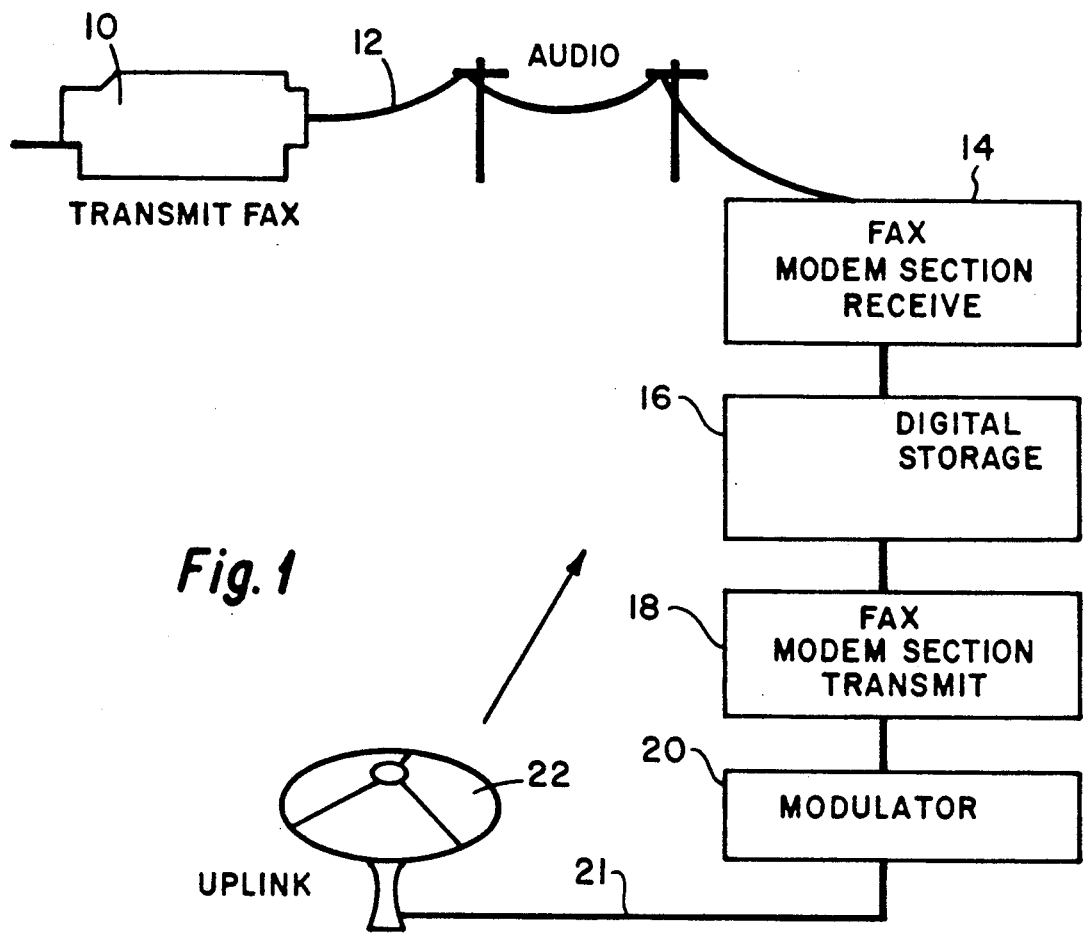
FIG. 1 is a schematic diagram of the basic method and system of the present disclosure for utilizing a signal provided by a document source, such as a standard fax machine or computer to provide a signal converted for transmission by a selected carrier simultaneously to a plurality of fax receivers.

This disclosure is a method and system for broadcasting facsimile (fax) messages or images in a one-way transmission media to a plurality of receivers stations, which stations have various makes and models of fax machines. The transmission scheme broadcasts to receiver stations having fax machines compatible with The International Telegraph and Telephone Consultive Committee (CCITT) standard for Group 3 (G3) Facsimile Apparatus. Specifications for the G3 device are found in the *CCITT RED BOOK*, Vol. VII - FACSIMILE VII.3 TERMINAL EQUIPMENT AND PROTOCOLS FOR TELEMATIC SERVICES, RECOMMENDATIONS OF THE T SERIES. The system requires a carrier having a band width and signal-to-noise ratio's at least equal to that of the standard telephone company (TELCO), and the fax machine at each of the receiver stations must receive the image or message using a common transmission bit rate.

The transmitter transmits a message or image according to CCITT modem specifications to a plurality of receiver stations, each of which has an unmodified G3 fax machines. The synchronizer electronics replicates the TELCO central office during fax transmission and passes the broadcast transmission audio signal directly to the fax machine. The transmission is simultaneously directed to a plurality of receiving fax machines each through an individual synchronizer.

The following definitions describe a G3 minimal exchange of messages necessary to transmit a multiple page document using the G3 specification and such designators will be used in this disclosure:

(a) Called Station Identification (CED)

In standard fax protocol a 1.8 to 2.5 seconds after a called fax machine is connected to a line, the receiver sends a continuous 2100 Hz+ −15 Hz tone for a duration of not less than 2.6 seconds and not more than 4.0 seconds. The called receiver delays for a period of 75+ −2-milliseconds after terminating the CED tone before transmitting further signals.

(b) Non-standard facilities (NSF)

This signal is normally used to identify specific user requirements, however, this is an optional signal and is not used in all cases.

(c) Digital Identification Signal (DIS)

This signal characterizes the standard CCITT capabilities of the called machine.

(d) Digital Command Signal (DCS)

The digital set-up command responds to the standard capabilities identified by the DIS signal.

(e) Training check (TCF)

This digital command is sent through the modulation system or carrier to verify training and to give a first indication of the acceptability of the channel for this data rate.

(f) Confirmation To Receive (CFR)

A digital command is sent through the modulation system or carrier to verify training and to give a first indication of the acceptability of the channel for this data rate.

(g) Transmit Message (PIX)

This signal is a transmission of the fax message or image.

(h) Multipage Signal (MPS)

This signal is to indicate the end of a page of fax information and to return to the beginning of phase C of the protocol upon receipt of a confirmation.

(i) End-of-procedures (EOP)

This signal is to indicate the end of a page of fax information and to further indicate that no further documents are forthcoming and to precede to phase E of the protocol upon receipt of a confirmation.

(j) Message Confirmation (MCF)

This signal is to indicate that a complete message has been received and that additional messages may follow. This is a positive response to (EOP).

Figure 2:
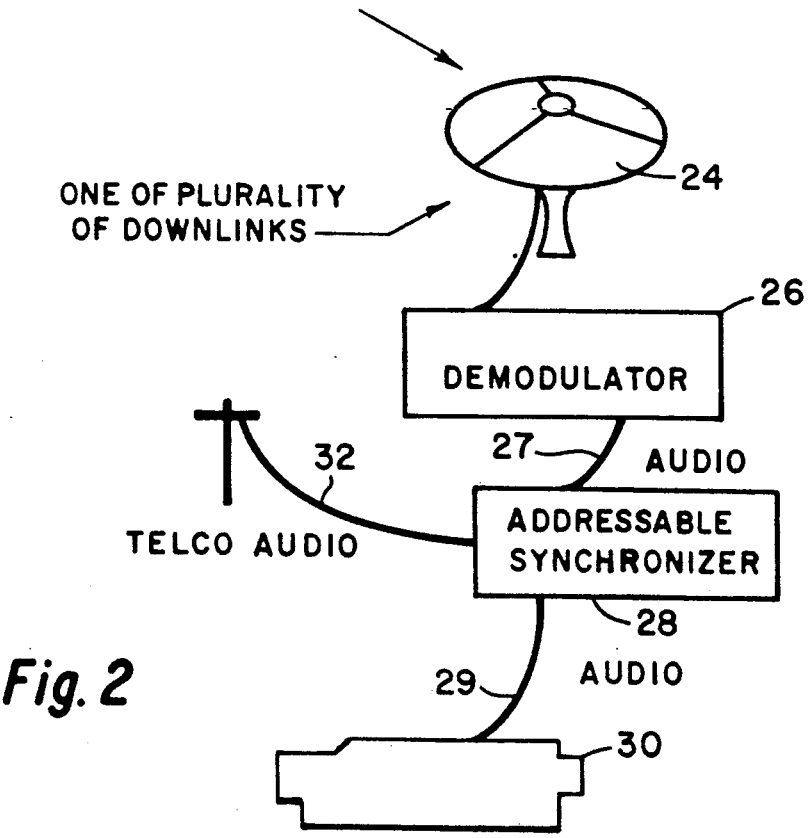
FIG. 2 is a schematic of one fax receiver including a standard fax machine and a synchronizer. The synchronizer adapts the fax machine to receive fax transmissions from the transmitter of FIG. 1 while also permitting the fax machine to function in its normal way to either transmit or receive fax messages to and from another standard fax machine, such as over a telephone circuit.
Figure 3:
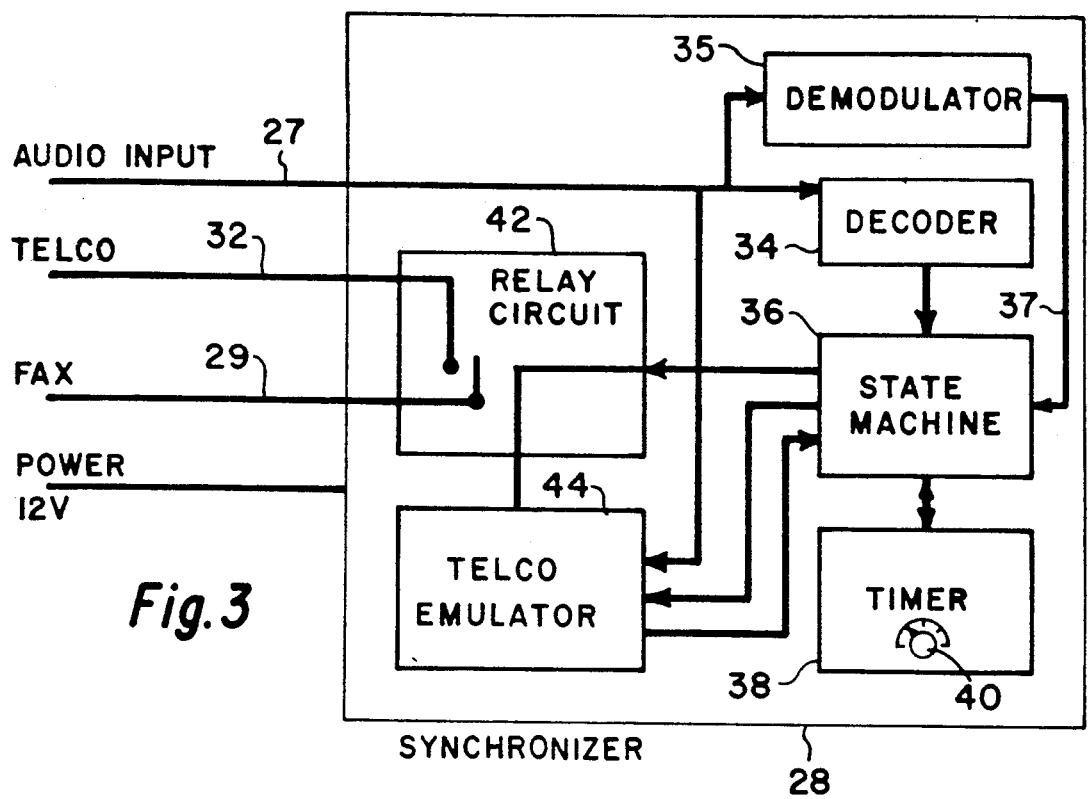
FIG. 3 is a schematic block diagram of a synchronizer as employed in FIG. 2 to adapt a standard fax machine to the method and system of the present disclosure.
Figure 4:
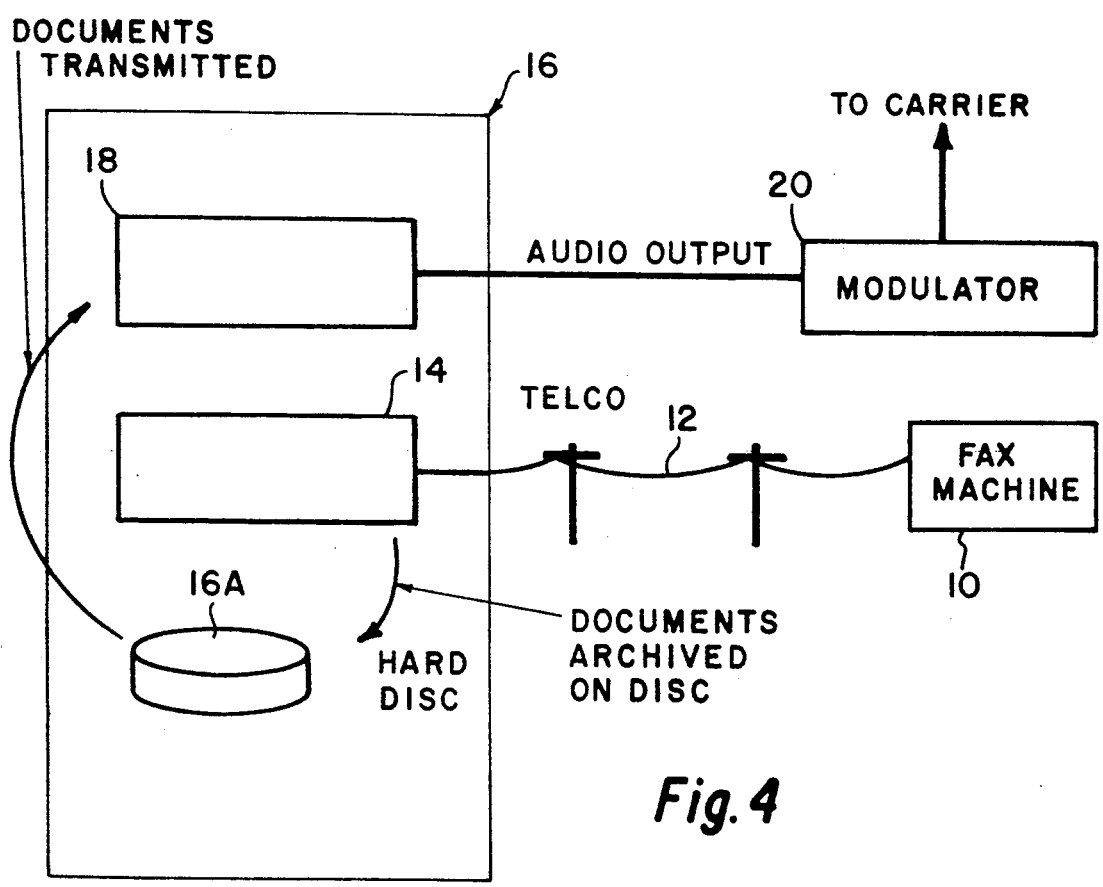
FIG. 4 is a schematic block diagram as in FIG. 1 of a transmitting system for transmitting a fax message simultaneously to a plurality of fax receivers and illustrating the manner of use of a digital storage apparatus in the transmission system.

Referring to FIGS. 1, 2, 3, and 4, the basic elements making up the system of this invention are shown. A fax machine is indicated by the numeral 10 and is a standard CCITT Group 3 (GIII) fax apparatus commercially available and commonly found at the present time in most business offices. Such standard fax machine 10 does not require alteration for use in the method of this disclosure (although a computer can also function as a document source in the same way that a computer can presently be used as a document source to an individual fax receiver). The fax signal to be transmitted including all typical initiating and hand-shake messages, are transmitted in the usual and typical way by means of audio frequency signals over a telephone line 12 to the transmitter. At the transmitter, a modem 14 is employed to receive the audio fax message from the telephone company line. The output of the modem is fed to a computer having a digital storage 16. This digital storage preferably includes, as illustrated in FIG. 4, a hard disc 16A. The output from the computer or digital storage 16A is fed to a fax transmit modem 18 which in turn is fed to a modulator 20. The modulator then provides a signal over line 21 fed to a broadcast transmission system which in FIG. 1 is exemplified by an uplink satellite transmitter 22. While the use of a satellite system represented by transmitter 22 is illustrative of a means of practicing the disclosure, other transmission systems may equally as well be employed, such as microwave transmission, radio transmission, satellite transmission or cable system transmission. Any distribution system which applies the output of modulator 20 simultaneously to a plurality of fax receiver stations which comply with the system of this disclosure is within the contemplation of the method herein provided.

FIG. 2 discloses the basic elements of a fax receiving station. The transmitted message is received such as by means of a satellite dish or downlink receiver 24. The signal therefrom is applied to a demodulator 26 which converts the received signal to an audio signal. The audio signal is conveyed to a synchronizer 28 which will be described in more detail subsequently. The output from synchronizer 28 is fed to a standard unmodified fax machine 30 of the type commercially available and can be of the same type as the transmitting fax machine 10 or may be of a different manufacture having different characteristics as long as such characteristics are within the International Telegraph and Telephone Consultive Committee (CCITT) standard for group G3 fax apparatus. The fax machine 30 which forms a part of the receiving station of FIG. 2 can, and in most cases will be connected by telephone line 32 through synchronizer 28 to a telephone company network so that the fax machine 30 can be used in the normal manner for sending and for receiving fax messages.

FIG. 3 shows the apparatus forming synchronizer 28. The audio input from line 27, that is, from the demodulator 26 (see FIG. 2), is fed to a decoder 34 and to an audio demodulator 35. The output of decoder 34 is fed to a state machine 36. A timer 38 with an adjustable delay 40, all of which will be described in more detail subsequently, establishes the time sequence for operation of a telephone company (TELCO) emulator 44. The function of TELCO emulator circuit 44 is to provide a telephone company like interface to receiving fax machine 30 (see FIG. 2) consisting of a current loop and a ring signal under control of the state machine 36. The function of demodulator 35 is to provide a digital bit stream over line 37 to state machine circuit 36. The overall function of the synchronizer 28 is to provide telephone company like signals and to provide information to the receiving fax machine 30 which are representative of those which would normally be exchanged between the transmitting fax machine 10 and the receiving fax machine 30, but which are not interchanged in the system of this disclosure since in this system there is no communication between the receiving fax machine 30 and the transmitting fax machine 10. A relay circuit 42 enables the receiving fax machine 30 to function in two modes. In a first mode, the fax machine 30 is connected by relay circuit 42 so that is can send and receive messages over telephone line 32, that is, in the manner fax machines are normally used. In a second mode, by the system of this invention the receiving fax machine 30 is activated by input from synchronizer 28 to receive signals which are simultaneously received by one or more additional fax machines.

The typical minimal G3 facsimile protocol for a two-page document is as follows:

| TRANSMITTING FAX | RECEIVING FAX |
|---|---|
| ring> | |
| | answer |
| | <CED |
| | <NSF (Optional) |
| | <DIS |
| DCS> | |
| TRN> | |
| TCF> | |
| | <CFR |
| TRN> | |
| PIX> | |
| MPS> | |
| | <MCF |
| TRN> | |
| PIX> | |
| EOP> | |
| | <MCF |
| DCN> | |

The transaction of sending a document is initiated by the caller in this minimal example. All messages are sent with a positive confirmation or handshake responsive to accurately received information. The transmitter terminates the transmission with a terminate or disconnect message.

The method and system of this disclosure works by initially calling or ringing a plurality of G3 fax machines 30. Each called fax machine 30 goes off hook in response to the ringing and sends the typical CED, NSF and DIS messages. Because the transmission media (22, 24) functions one-way, the CED, NSF and DIS messages are not detected by the transmitting station of FIG. 1. During a normal two-way conversation, the transmitter would wait for the CED, NSF and DIS messages before transmitting the next message commands. In the broadcast transmission scheme herein, the broadcast transmitter (14, 16, 18, 20, 22) does not receive the CED, NSF and DIS messages, but waits the necessary time for the receiver to send such CED, NSF and DIS messages. Each receiving fax machine 30 responds as if it is successfully sending the CED, NSF and DIS messages to the transmitting fax machine 10. See FIG. 5 which shows the timing sequences herein described, showing the transmission sequence, synchronizer sequence, and the sequences of three fax receivers (30 being one example) each having slightly different timing sequences.

The transmitter blindly transmits a DCS, TRN and TCF message after waiting a period of time necessary for all the receive fax machines to send irrelevant CED, NSF and DIS messages.

The transmitter once more waits for the receiver to send an irrelevant CFR confirmation, which is never received. After waiting for the CFR to be sent, the transmitter blindly transmits the TRN, PIX and MPS messages. If the page is the last page in the document, the EOP message is sent instead of the MPS. In case the final page is being transmitted, the transmitter waits for the last confirmation (MCF) and sends blindly a disconnect (DCN) message. The blind transmission of the DCN message terminates the transmission sequence. Such broadcast transmission system assumes the receiving fax machine 30 is receiving the transmission and is confirming each set of transmission messages with an unreceived positive confirmation message. Any deviations taken from the minimal G3 transmission protocol by the receiver are undetected and are assumed to never take place. Deviations from the protocol can occur if a received fax machine was unable to train with the transmissions TRN, TCF. The received fax machine would demand the transmitting fax re-transmit the TRN, TCF messages or choose a lower transmission rate and re-transmit the TRN, TCF. Because multiple fax machines are receiving the same G3 fax minimal transmission conversation, one machine deviating from the norm results in the one machine loosing the document. Insuring that the transmission band width and signal to noise ratio are equal to or greater than TELCO enables the transmission scheme to blindly transmit a message and to assume that all fax receiver machines in the system properly received the message.

The system is dependent on two sub-systems working in conjunction. On the transmission side as disclosed in FIGS. 1 and 4, the transmitted fax messages are blindly sent without receiving the usual return handshake messages. On the received side, it is necessary for the synchronizer 28, FIG. 3, to begin ringing the fax machine 30 at such a time that the receive fax machine is ready to receive the DCS, TRN and TCF message package when the transmitter sends the messages. The time a receiving fax takes to go off hook in response to a ring, then send the CED, NSF and DIS, is machine-to-machine variable. The time variance is dependent upon which ring a fax machine answers on and how much information is sent in the NSF and DIS message. After the fax machine has been characterized for timing variances, the receiving fax machine 30 can be rung with timing control to synchronize the receipt of the DCS, TRN, TCF message sent by the transmitter.

The synchronizer electronics 28 of FIG. 3 has three functions: (a) to provide an interface for the fax machine emulating the TELCO current loop and ring signals; (b) to control the ring with timing sequence to receive fax machine 30 upon receipt of a transmitted synchronizer message; and (c) to provide specific receive fax machine addressability to control document receipt to the specific electronics. Control and addressing of the synchronizer takes place outside the G3 transmission and does not interfere with the standard facsimile protocol.

Figure 7:
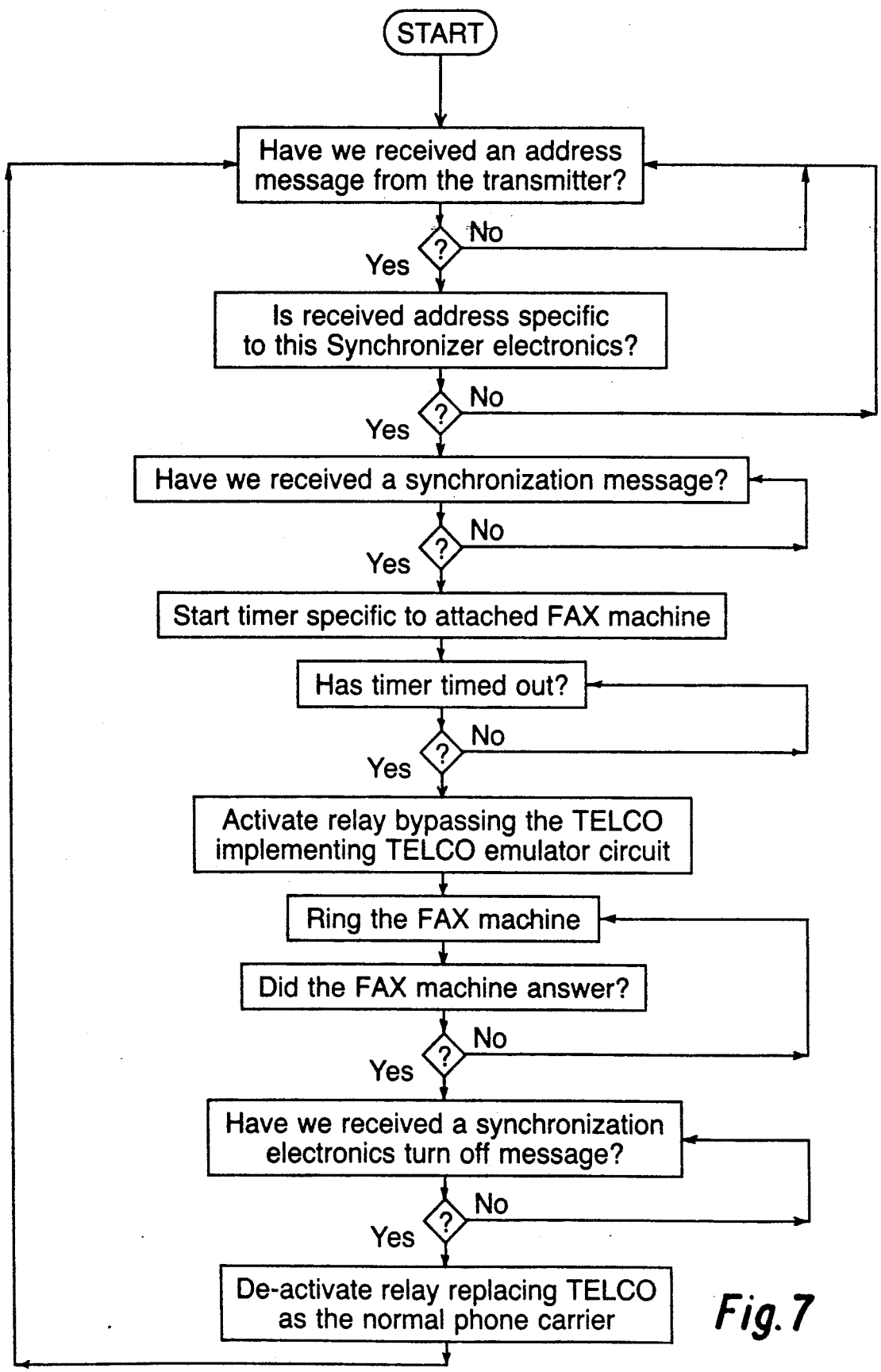
FIG. 7 is a flow chart of the function of the electronics of the synchronizer circuit of FIGS. 2 and 3, which flow chart is utilized in the form of software in the synchronizer.

Referring again to FIG. 3, the circuit synchronizer electronics consists of six modules. A Dual-Tone Multiple Frequency (DTMF) decoder 34 monitors the audio input line 27 and decodes DTMF tones transmitted by the transmission electronics. The DTMF tones are sixteen combinations of high and low frequency tones, twelve of which are used by United States touch tone telephones to dial phone numbers into a TELCO. Decoder 34 is commercially available from Mitel Semiconductor as product number MT8870. State machine 36 is a synchronous digital circuit consisting of single bit memories as flip-flops with combinational logic designed to produce a desired output as a function of the input and past history. Outputs are realized when the machine is clocked at the 30 Hz reference signal. Solid state circuitry which provides the sequence of the flow chart of FIG. 7 fulfills the requirements of the state machine 36. An eight bit digital down counter 38 is provided with a state machine settable switch 40 setting the controlling timer preset, providing adjustable delay from 0 to 8.5 seconds in 33.3 millisecond increments. Timer 38 is clocked with the 30 Hz reference signal. This component is commercially available as manufactured by National Semiconductor as part number MM5369AA. A relay circuit 42 normally provides TELCO access to the fax machine. A relay which is useable in the system is manufactured by Potter and Brumfield as part number T82P11D111-05. During broadcast transmissions, relay 42 is activated, and the TELCO is removed from the fax current loop circuit and TELCO emulator 44 circuit provides the necessary telephone interface to the fax machine. A TELCO emulator circuit 44 provides a talk-battery voltage or current loop, controllable ring, and 600 ohms output impedance to the fax machine. The circuit injects the audio input 27 into the current loop. A Metro Tel Corp. model #28RGKTU ring supply can be placed with a typical telephone talk-battery voltage supply to provide the ring supply power of the TELCO emulator 44.

The state machine 36 monitors decoder 34 for the DTMF tone (star (*) key on a telephone touch pad) or synchronizer tone transmitted on the audio input channel. Upon valid receipt of a synchronizer tone (*), state machine 36 starts the countdown timer 38 and activates the relay 42, cutting off the TELCO from the fax and relay 42 switches to the TELCO emulator 44. The TELCO emulator 44 injects the received audio into the TELCO emulator fax current loop. State machine 36 monitors the timer until it times down. Upon timer countdown, the state machine 36 forces the TELCO emulator 44 ring electronics to begin ringing the receiver fax machine represented by machine 30 (FIG. 2). Upon answering, each fax receiving machine sends a CED, NSF, DIS message which is injected into the TELCO emulator fax current loop, but is never received by the one-way transmitter device. After the receiving fax sends the irrelevant CED, NSF, DIS message, each receiving fax machine 30 should be in a position to receive the DCS, TRN, TCF message. The preset 40 on timer 38 must be set to align the transmission of the DCS, TRN, TCF with the receiver answering a ring and sending the CED, NSF, DIS messages. It is necessary for any standard G3 fax machine in the receive network to be characterized for timing by observing the time required for a machine to pick up and complete the CED, NSF, DIS messages after ringing the fax machine. The timing characterization of the receive fax machine 30 is observed by the state machine 36 when the receive fax machine 30 is actively rung. The state machine 36 monitors the demodulator 35 for the receive fax machine sending irrelevant CED, NSF and DIS messages. The time for the receive fax 30 to respond to the first ring and answer back the CED, NSF and DIS message is the characterization time. The state machine circuit 36 uses the observed characterization time to set the timer 40 preset.

The broadcast of a facsimile transmission is achieved using the components of FIGS. 1 and 4. Those components are represented by the following commercially available system parts:

(a) A PC Designs 386—20—IBM PC compatible comput 4 MByte of Ram, two 40 MByte of Seagate hard disk drives, a Hercules monochrome graphics driver and monitor, shown collectively as element 16 in FIGS. 1 and 4.

(b) A Quadram 9600—a 9600 bit per second G3 fax compatible PC fax card-input interface, shown as element 18 in FIGS. 1 and 4.

Figure 5:
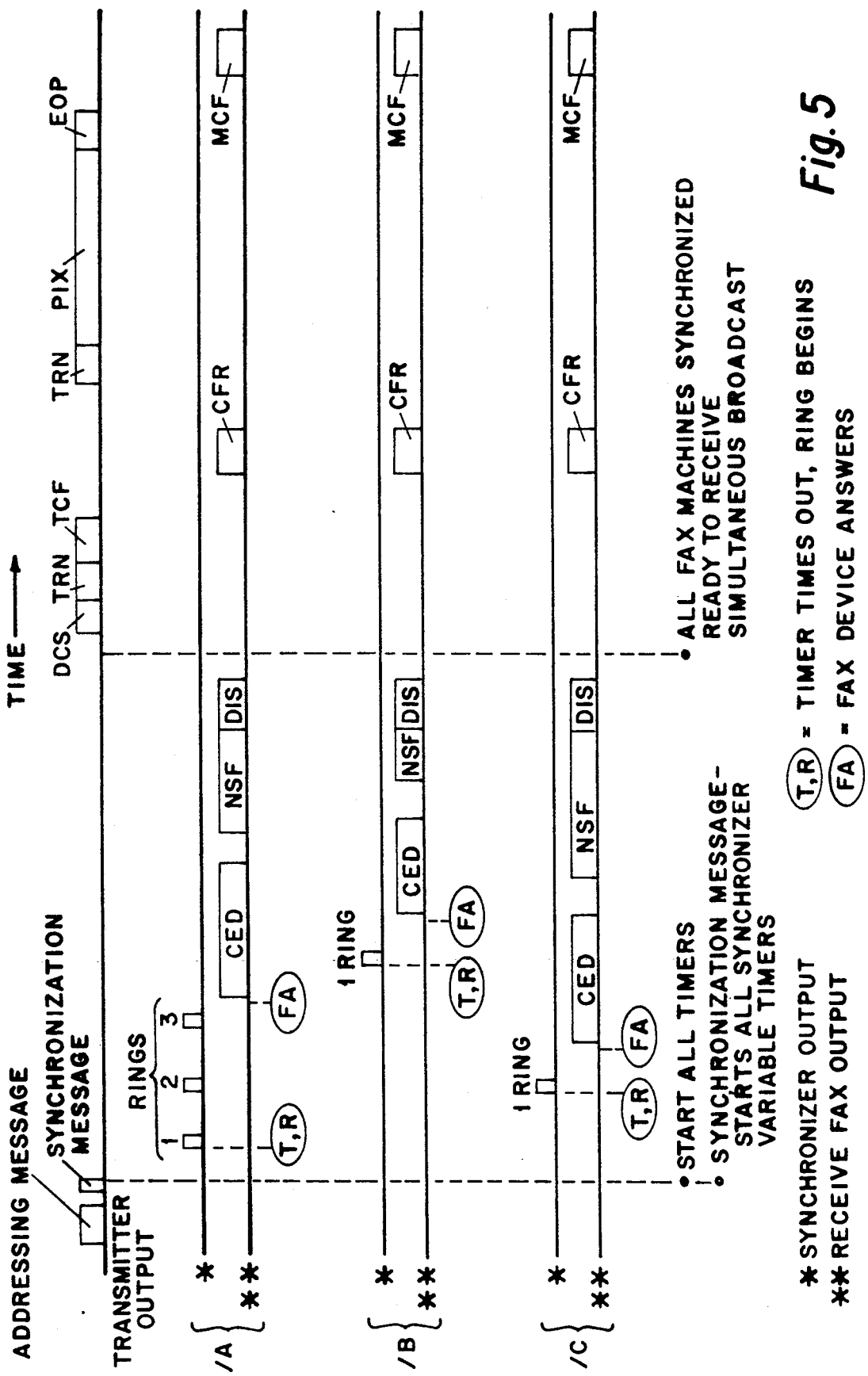
FIG. 5 is a timing diagram showing the timing sequence for a fax transmitter and for three separate fax receivers, each receiver having a fax machine having different receiving characteristics and illustrating the method of use of time delays so that each of the plurality of fax receivers will be in condition to receive simultaneously a fax message from the transmitter.
Figure 6:
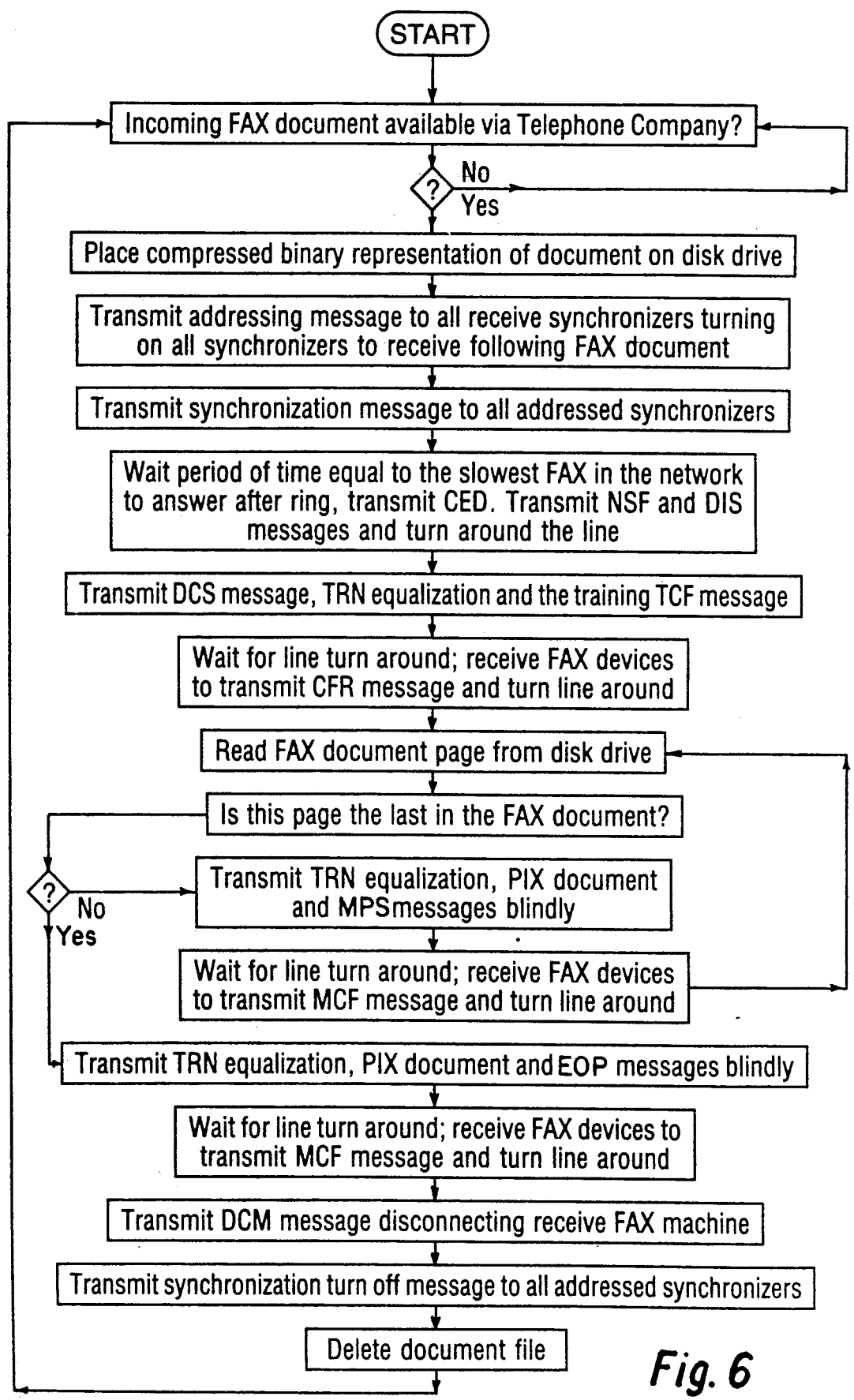
FIG. 6 is a flow chart of the steps employed in the transmitter system of FIGS. 1 and 4.

(c) A GammaFax GF010—a 9600 bit per second G3 fax compatible PC fax card-Output Interface is a 3.5 Khz audio modulator, shown as element 14 in FIGS. 1 and 4. The computer 16 receives fax documents over the TELCO line 12 in a modified read format, and stores the compressed document on the hard disk drive 16A. The calling fax uses the standard G3 protocol with full handshake and baud rate step down, insuring accurate receipt of the document. The Quadram interface board 14 receives documents via the normal two-way TELCO line 12. Upon receipt of the document placed on hard disk 16A, the transmitting system then executes a blind broadcast transmission program, sending the newly received documents to all receiving faxes 30 via one-way transmission using the GammaFax board 18. The blind broadcast transmission program initially sends a DTMF (*) synchronizer tone to the fax receivers, starting the variable countdown timers 38. The blind broadcast transmission program waits the characterized time of the slowest responding receive fax machine in the network (plus the G3 required time to turn the line around), and blindly sends the DCS, TRN, TCF messages, as illustrated in FIG. 5. The synchronizer electronics in the slowest responding fax has a 0 millisecond timer setting 40 which causes the ring to begin immediately when the synchronizer tone (*) is transmitted. All other fax machines in each fax receiving station are either equally slow and have identical timer settings 40 or are faster and have to be delayed to hold off the receive fax waiting too long for the transmission of the DCS, TRN, TCF messages. The blind transmission waits the necessary time for each receive fax machine to send an irrelevant CFR and then blindly transmits the TRN, PIX, MPS messages. Once more the blind broadcast transmission program waits the necessary time for a receive fax to send a confirmation message, and continues blind transmissions of documents or terminates the fax conversation with the disconnect message. Upon completion of the transmission, the program sends a DTMF (*) tone which upon a signal supplied by state machine circuit 36 deactivates the relay circuit 42, disconnecting the fax machine from the TELCO emulator 44 and the transmitted audio line 27. The time sequences of the transmitting system and three representative facsimile receivers 1A, 1B and 1C are illustrated in the timing diagram of FIG. 5.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein but is to be limited only by the scope of the attached claim or claims, including the full range of equivalency to which each element thereof is entitled.

What is claimed is:

1. A system for the simultaneous transmission of information to a plurality of standard facsimile receivers, in which each facsimile receiver has a nascent state and a minimum time characteristic for responding to a call in which called station identification, digital identification signals and other responsive signals are characteristically transmitted by the receiving facsimile receivers, comprising:
   means to transmit by selected carrier a unitary signal from a unitary location to a plurality of facsimile receivers;
   means with said transmit means to provide spaced ring signals to which said receivers are responsive, such means providing a selected number of ring signals equal to at least the maximum number required by each of the facsimile receivers;
   means with said transmit means to provide a digital command signal and training check command signal to the plurality of facsimile receivers, such signals being delayed following said ring signals a selected time commensurate with the maximum time required by said plurality of facsimile receivers;
   means with said transmit means of transmitting a facsimile message simultaneously to said plurality of facsimile receivers, such means being delayed a preselected length of time following said digital command and training check command signals required for each of said facsimile receivers to reach the ready state to receive the facsimile message;
   means, upon the termination of said facsimile message, of transmitting an end of procedure message by said transmitter means which is received simultaneously be each of said facsimile receivers to thereby cause the facsimile receivers to terminate the procedure and return to their nascent states.

2. A method of simultaneously transmitting information to a plurality of standard facsimile receivers in which each receiver has timing and response characteristics which may vary from other receivers, comprising:
   transmitting by a selected carrier path a unitary signal from a unitary transmitter location to a plurality of facsimile receivers time-spaced ring signals, the number of ring signals being at least equal to the number of ring signals to which each of the receivers respond;
   delaying further transmission a preselected length of time during which the individual receivers generate standard called station identification and other signals which are irrelevant to the transmitter;
   transmitting predetermined command signals which are simultaneously received by said facsimile receivers as required to place all receivers in condition to receive a facsimile message;

delaying further transmission a preselected length of time during which the individual receivers generate standard confirmation to receive signals which are irrelevant to the transmitter;

transmitting a facsimile message simultaneously to the plurality of receivers; and transmitting an end of procedure message simultaneously to the plurality of receivers.

3. For use with a CCITT Group 3 facsimile machine, a synchronizer circuit enabling such machine to receive simultaneously with other CCITT Group 3 facsimile machines, a facsimile transmission from an unitary source, comprising:

means providing, in response to received signals from said unitary source, current loop and ring signals emulating those produced by standard telephone company protocol and to which the facsimile receiver is responsive;

means, in response to receipt of a synchronizer signal from unitary source, of controllably delaying said ring signals a preselected time corresponding to the characteristics of the facsimile machine to which said synchronizer circuit is attached, whereby the last ring signal required is rung substantially simultaneously in each separate facsimile machine; and means providing preselected address signals responsive to the facsimile machine to which it is connected to place the machine in condition to receive a subsequent facsimile message.

* * * * *